US010009246B1

(12) United States Patent
Benattar

(10) Patent No.: US 10,009,246 B1
(45) Date of Patent: Jun. 26, 2018

(54) MONITORING SERVICE

(71) Applicant: Amazon Technologies, Inc., Reno, NV (US)

(72) Inventor: Gary Ange Benattar, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 468 days.

(21) Appl. No.: 14/228,916

(22) Filed: Mar. 28, 2014

(51) Int. Cl.
*G06F 15/173* (2006.01)
*H04L 12/26* (2006.01)

(52) U.S. Cl.
CPC .......... *H04L 43/0876* (2013.01); *H04L 43/04* (2013.01)

(58) Field of Classification Search
CPC .................. G06F 17/3089; G06F 2201/875
See application file for complete search history.

(56) References Cited

U.S. PATENT DOCUMENTS

| | | | | |
|---|---|---|---|---|
| 7,331,060 B1 * | 2/2008 | Ricciulli | .............. | H04L 63/1458 709/227 |
| 8,059,548 B1 * | 11/2011 | Bisarya | ............... | G06F 11/3006 370/242 |
| 8,782,166 B1 * | 7/2014 | Deshpande | ........ | G06Q 30/0246 709/217 |
| 2001/0034637 A1 * | 10/2001 | Lin | ......................... | G06Q 10/04 709/229 |
| 2002/0111907 A1 * | 8/2002 | Ling | ...................... | G06Q 20/04 705/41 |
| 2003/0154237 A1 * | 8/2003 | Mah | ................... | G06F 17/30905 709/201 |
| 2007/0150949 A1 * | 6/2007 | Futamura | ............ | H04L 63/1416 726/22 |
| 2009/0024911 A1 * | 1/2009 | Margolis | ............... | G06T 11/206 715/215 |
| 2011/0179153 A1 * | 7/2011 | Masputra | .............. | G06F 1/3203 709/223 |
| 2012/0324083 A1 * | 12/2012 | Lee | ..................... | H04L 67/1002 709/223 |
| 2013/0013801 A1 * | 1/2013 | Leeder | ................... | G06Q 30/02 709/231 |
| 2013/0030761 A1 * | 1/2013 | Lakshminarayan | . | G06K 9/6219 702/179 |
| 2013/0196689 A1 * | 8/2013 | Smith | ................... | H04W 4/206 455/456.3 |
| 2015/0205449 A1 * | 7/2015 | Sinha | ................ | G06F 17/30994 715/234 |

* cited by examiner

*Primary Examiner* — Kevin Bates
*Assistant Examiner* — Dae Kim
(74) *Attorney, Agent, or Firm* — Lee & Hayes, PLLC

(57) ABSTRACT

Described herein are techniques for detecting abnormal volume of high cardinality metrics within a system in substantially real time. For example, a device may be configured to model a system as a tree-structure capable of monitoring the volume of data points or contact between users of the system with various nodes of the tree structure. The value of each counter may be normalized based on the value of the counter associated with one or more parent node. The normalized time series may then be compared to one or more thresholds to detect abnormal volumes associated with the node.

20 Claims, 6 Drawing Sheets

MONITORING SERVICE

BACKGROUND

Today many types of transactions are performed over the internet and telephone networks. Because of this, many companies have heavily invested in both electronic systems and applications. These companies typically employ monitoring services to detect abnormal volume or activity with regards to the systems and applications. By monitoring the volume and activity levels on the systems, the companies are more easily able to detect errors and abnormal changes in volume.

However, monitoring services today rely on historical data in order to detect abnormal volume changes. Unfortunately, the historical data must be collected for several years before the monitoring services are able to effectively detect abnormal volume changes. Additionally, typical monitoring services are unable to detect abnormal volume changes in real time when the information may be most useful as the calculations typically involved using historical data are computationally intensive.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
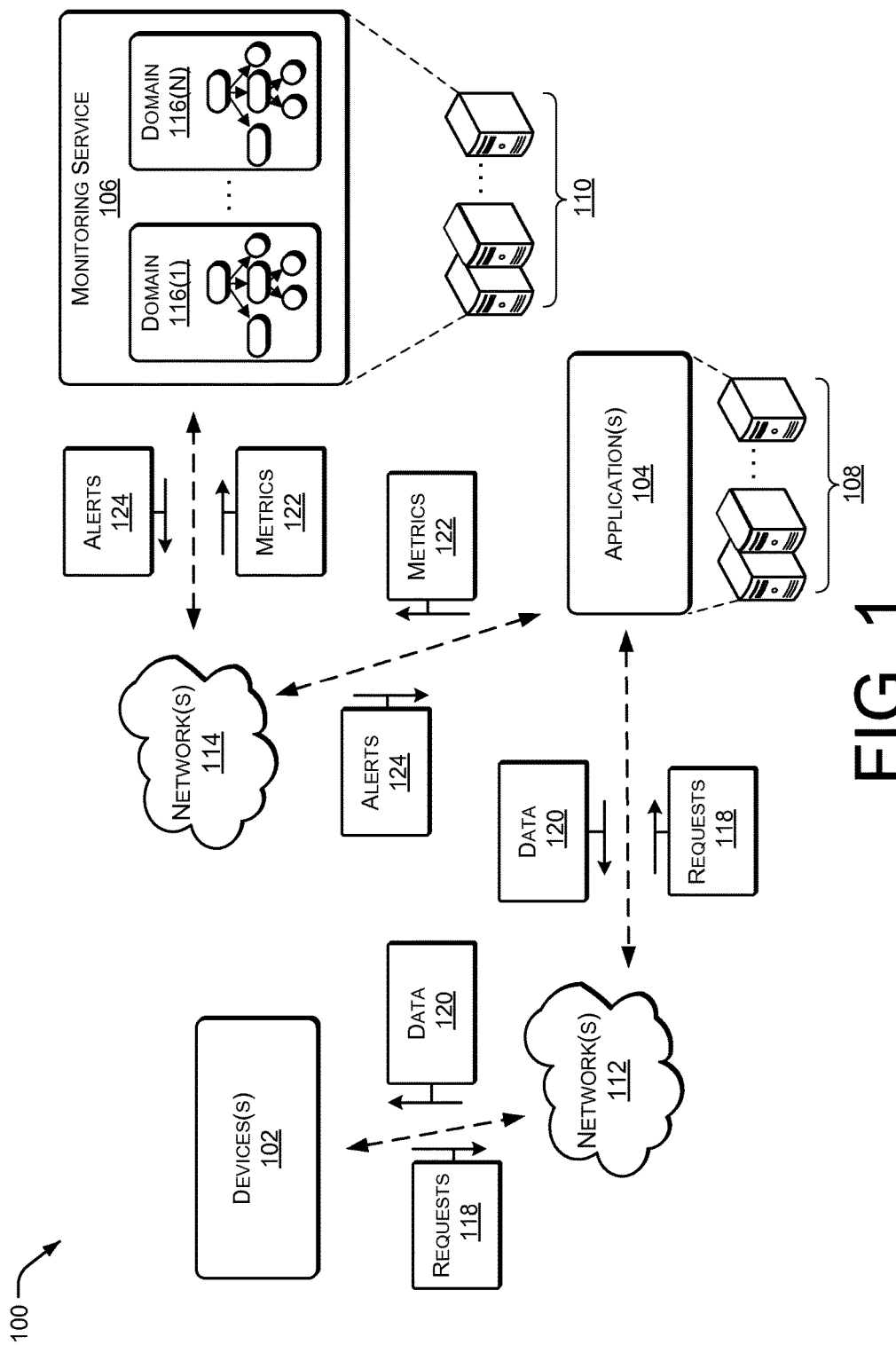
FIG. 1 illustrates an example system architecture including multiple devices accessing one or more applications or services monitored by one or more monitoring services.

This disclosure includes techniques and implementations to improve performance of services for monitoring business metrics associated with applications and systems. In particular, this disclosure describes ways to reduce reliance on historical data and to improve the timeliness with respect to detecting abnormal volume changes in the application or system having high cardinally metrics. For example, in some implementations, the monitoring services or platforms described herein utilize tree-structures to model domains, such as market places, and to normalize volume metrics (e.g., data points or contacts) according to time-series analysis. In other implementations, the monitoring services or platforms may utilize a sliding-window and the time-series to remove false positives with respect to volume metrics to increase the accuracy of the service.

For instance, many typical application or system monitoring services or platforms rely heavily on comparing historical volume to current volume in order to detect abnormalities in high cardinality metrics. Unfortunately, collecting sufficient historical data can take several years. For example, comparing volume metrics collected during a previous month to volume metrics collected during a current month often results in inaccurate findings, as the market conditions may change. For instance, the volume of sales during October is typically much lower than the volume of sales during November or December. Further, comparing data in a particular month to the same month last year may also result in inaccurate findings, as the volume of sales last year may have been abnormal. Thus, monitoring services or platforms that rely on historical data utilize several years of data in order to normalize the results to compensate for seasonality patterns and accurately detect volume changes.

In some implementations, the monitoring service described herein arranges each volume metric or domain into a tree-structure with the metric or domain being the root. In some instances, the tree-structure is a data structure in which the data is organized so that the tree may be traversed from a root or initial data location to one or more other data locations or nodes. Further, in some examples, the data and/or arrangement of the data within the tree-structure may be utilized to determine abnormal volume associated with one or more of the nodes.

In an example, when the monitoring service is configured to monitor sales volume, the sales domain may be arranged with a marketplace (e.g., www.ABCstore.com®) as the root node, the departments (e.g., Toys) and/or product types as internal nodes, and the products or items (e.g., a yellow toy truck or a doll) as the leaf nodes. In another example, when monitoring customer service calls, the customer service domain may be arranged with the customer service department as the root node, sub-departments (e.g., complaints, returns, etc.) as the internal nodes, and particular sales representatives or associates as the leaf nodes.

In some implementations, at each node of the tree-structure, the number or volume of contact with the node is recorded using one or more volume counters. In some cases, a contact is recorded when an end-user interacts (e.g., views a page, makes a purchase, answers a call, etc.) with the subject of the node in question. For instance, in the sales domain, any purchase made from the marketplace increments the counter at the root node, any sales made in a particular department (e.g., toys) increments the particular department counter (e.g., the toys), and any sales made for a particular item (e.g., a yellow toy truck) increments the particular item counter. Thus, the sales domain may include a tree-structure with 120 sales at the marketplace, 20 sales in the toys department, 40 sales in the cosmetic department, and 60 sales in the clothing department, 10 sales of yellow trucks, 10 sales of skateboards, 30 sales of perfume, 10 sales of lipstick, 30 sales of sweaters, 10 sales of shorts, and 20 sales of jeans. In this manner, the distribution of contacts or interactions within each level of the tree is maintained relative to the parental nodes.

In this example, each division-path (e.g., a path between the root and a leaf node) may be considered to be a time-series and the volume metrics along the path may be used to normalize the counters associated with nodes along the division-path in lieu of using historical data. For instance, each node within a time-series may be normalized based on the parent nodes or the root node. In an example, each product may be normalized based on the number of sales in the marketplace and/or the number of sales within the department. In this manner, rather than comparing historical volume data, the monitoring service described herein detects abnormal usage with respect to the total number of contacts or interactions associated with the parent nodes along the corresponding division-path. By normalizing the volume data in this manner, the abnormal volume levels may be detected in substantially real time, as the computationally intensive historical calculations no longer need be performed.

In some implementations, to further improve the accuracy with which abnormal volume may be detected, the monitoring service applies a sliding-window associated with a time period to the domain. For example, the monitoring service may normalize the division-paths based on total number of contacts or interactions within a 15 minute period. By utilizing the sliding-window to define the number of contacts or interactions, the monitoring service is able to accommodate changing seasonality patterns, as an abnormality is based on the number of total accesses within a given period of time. Thus, to detect an abnormality during the day, a higher number of sales of yellow trucks is required than to detect a similar abnormality during the night when fewer customers are purchasing goods via the marketplace.

In some implementations, the monitoring service or the application being monitored may define abnormal volume by applying one or more thresholds. For instance, an abnormal volume may be detected when more than 10 yellow trucks are sold per 100 users in the marketplace. Thus, in this implementation, the abnormal volume may be monitored and detected on a product by product or item by item basis.

FIG. 1 illustrates an example system architecture 100 including multiple devices 102 accessing one or more applications or services 104 monitored by one or more monitoring services 106. For example, the applications or service 104 may include customer service applications, online sales applications, social networks, subscription services, and/or inventory applications. In the illustrated implementation, the applications 104 are hosted on servers 108 and the monitoring service 106 is hosted on servers 110. However, it should be understood that devices 102, servers 108, and servers 110 may be any type of device including a network interface. For example, the devices 102, servers 108, and servers 110 may be a desktop computer, tablet computer, electronic book reader device, household appliance, cellular phone, among others.

The devices 102 may be communicatively coupled to the servers 108 hosting applications 104 over one or more networks 112 and the servers 108 may be communicatively coupled to servers 110 hosting monitoring service 106 over one or more networks 114 via wired technologies (e.g., wires, USB, fiber optic cable, etc.), wireless technologies (e.g., RF, cellular, satellite, Bluetooth®, etc.), or other connection technologies. The networks 112 and 114 may be any type of communication network, including data and/or voice networks, and may be implemented using wired infrastructure (e.g., cable, CAT5, fiber optic cable, etc.), a wireless infrastructure (e.g., RF, cellular, microwave, satellite, Bluetooth®, etc.), and/or other connection technologies. Generally, the networks 112 carry data between the applications 104 and the devices 102 and networks 114 carry data between the applications 104 and the monitoring service 106. In some implementations, the networks 112 and 114 may be the same.

The servers 108 and 110 may be owned by a single entity and co-located at a common data center or located at separate data centers. Alternatively, the servers 108 and 110 may be owned and operated by independent entities at separate locations. The servers 108 and 110 may be further arranged in any number of ways, such as server farms, stacks, and the like that are commonly used in data centers.

The applications 104 generally refer to a network accessible platform implemented as a computing infrastructure of processors, storage, software, data access, and so forth, illustrated as servers 108, and that is maintained and accessible via one or more networks 112. The applications 104 do not require end-user knowledge of the physical location and configuration of the system that delivers the services. Common expressions associated with cloud services include "on-demand computing," "software as a service (SaaS)," "platform computing," "network accessible platform" and so forth. For example, the applications 104 may include one or more online marketplace (e.g., www.ABCstore.com®), one or more customer service system, one or more social network, one or more index or database, one or more email systems, among others.

The monitoring service 106 generally refers to a network accessible platform implemented as a computing infrastructure of processors, storage, software, data access, and so forth, illustrated as servers 110, and that is configured to access the applications 104 via one or more networks 114. The monitoring service 106 maintains one or more domains 116 in order to monitor usage of application 104, as well as to detect abnormal volume or usage in substantially real time. Each of the domains 116(1)-(N) are maintained as a tree-structure in which each node of the tree maintains an independent counter equal to the volume of contact or interactions associated with each particular node.

The monitoring service 106 is further configured to detect abnormal volume with respect to the application 104. For instance, an abnormal volume or usage level may be indicative of abnormal number of sales related to a particular item and may necessitate the re-allocation of servers or processing resources, which may be accomplished if the abnormal volume levels can be detected in substantially real time.

The monitoring service 106 is able to detect the abnormal volume levels by first normalizing the counters associated with each of the leaf nodes based on counters associated with one or more of the parent nodes of the leaf node in question. Once the counters are normalized, the monitoring service 106 may detect abnormal volume levels by comparing the normalized counters associated with each of the leaf nodes in the domain tree-structure to one or more predefined thresholds. While the monitoring service described herein does not require historical data, in some implementations, the predefined threshold may be based on or in part on historical volume metrics collected from the monitored applications.

In some implementations, the monitoring service 106 further improves the accuracy and timing associated with identifying abnormal volume levels by applying a sliding-window or time period to the domains 116(1)-(N) to compensate for seasonality patterns caused by the volume of contacts or interactions associated with a domain varying over time. For example, the number or volume of sales tends to be higher in November and December than in, for instance, January or February. In another example, the volume of contacts or interactions associated with the customer service domain may vary over much smaller time periods such as the time of day. For instance, the number of calls may be higher around lunch time and after work hours than during work hours or late at night. Thus, to compensate for the seasonality patterns, the monitoring service 106 may apply a sliding-window or time period, such that contacts or interactions are removed from the counters as they age. For example, a sliding-window of one hour may be applied such that any contact that was published more than an hour prior to the current time are subtracted. In other examples, the sliding-window of an hour may be applied based on a time-stamp associated with a user request. For instance, an administer of a system may issue a demand to the monitoring service 106 in order to determine if an abnormal volume is present with regards to a particular node. In this instance, the monitoring service 106 may apply a sliding-window by normalizing the number of contacts over the previous hour. In this manner, the counters associated with the leaf nodes are adjusted to compensate for changes in the time of day and normalized based on the total number of contacts or interactions within a particular domain 116(1)-(N) resulting in a monitoring service 106 that is able to accurately detect abnormal volume with respect to the application 104 in substantially real time.

In the illustrated example, the devices 102 make multiple requests 118, contacts, or interactions with the application 104. For example, users may utilize the devices 102 to make purchase merchandise from the application 104, contact a customer service representative or associate, access a social media website, etc. Thus, the requests 118 may include a plurality of data associated with purchasing merchandise, contacting a customer service representative or associating, and/or accessing a social network, etc. Regardless of the type of the requests 118, the application 104 receives a request and responds by providing data 120 associated with the request back to the requesting device 102.

In addition to responding to requests 118, the applications 104 provide volume metrics 122 associated with the requests 118 to the monitoring service 106. Alternatively, the monitoring service 106 may extract or pull the volume metrics 122 from the application 104. Generally, the volume metrics 122 include data related to the number of the requests 118 or contacts or interactions received at the application 104. In some instances, the volume metrics 122 may include details related to the type of the requests 118 received. For example, the volume metrics 122 may include the type or name of each product purchased, in addition to the number of purchases processed.

As the volume metrics 122 are received at the monitoring service 106, the monitoring service 106 updates each of the domains 116(1)-(N) related to one of the requests 118. For instance, the volume metrics 122 may include data related to one or more sales and/or data related to one or more customer service calls. In this example, the monitoring service 106 may update both the sales domain and the customer service domain based on the volume metrics 122 received.

In one implementation, the monitoring service 106 updates the domains 116(1)-(N) by revising the tree-structure maintained for each domain 116(1)-(N). For example, if the volume metrics 122 published by the application 104 indicate that 5 yellow toy trucks were purchased since the last publication, the monitoring service 106 may update the tree-structure associated with the sales domain by adding 5 contacts to the marketplace node counter, 5 contacts to the toy department node counter, and 5 contacts to the yellow toy truck node counter. The monitoring service 106 may also update the tree-structures by removing stale contacts from the counters as describes above.

The monitoring service 106 is able to monitor volume changes by normalizing the counters at the leaf nodes based on the counters, for example, at the root node, and comparing the normalized counters to one or more thresholds. If the monitoring service 106 determines that one or more of the normalized counters exceeds one or more of the thresholds, the monitoring service 106 may generate and send one or more alerts 124 to the application 104 or an administrator of the application 104. In some instances, the monitoring service 106 may select a threshold to compare the normalized counters based on multiple brackets. For example, if the normalized value of the counter falls into a first range (or bracket) the monitoring service 106 may apply a first threshold, while if the normalized value falls into a second range (or bracket) the monitoring service 106 may apply a second threshold. In one implementation, the alerts 124 may be configured to indicate to the administrator the location of the abnormal volume and some type of warning as to the level of severity.

In an example, the alerts 124 may include a product name receiving an abnormal number of purchases or views, as well as the number of abnormal contacts. In another example, the alerts 124 may include a list of actionable tasks or suggestion, which may be performed to correct the abnormal volume flow and/or a list of non-actionable nodes in which the abnormal volume flow may be uncorrectable or temporary. In some examples, the alert 124 may include a user selectable link to an exploration interface that the administrator or other user may utilize to diagnose the cause of the abnormal volume.

Figure 2:
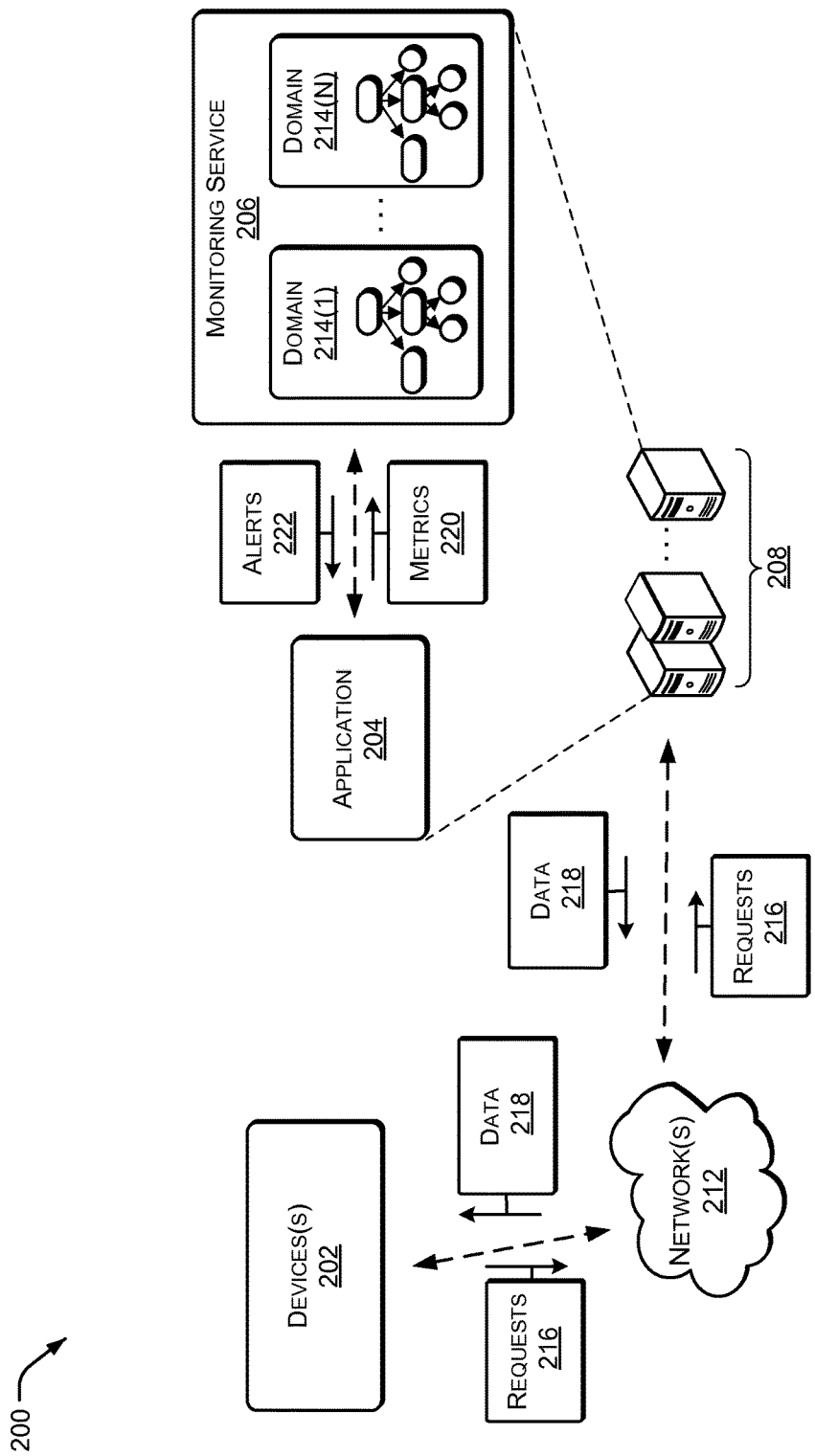
FIG. 2 illustrates another example system architecture including multiple devices accessing one or more applications with incorporated monitoring service.

FIG. 2 illustrates another example system architecture 200 including multiple devices 202 accessing an application 204 with incorporated monitoring service 206. In the illustrated implementation, the application 204 and monitoring service 206 are hosted by servers 208. However, it should be understood that devices 202 and servers 208 may be any type of device including a network interface. For example, the devices 202 and servers 208 may be a desktop computer, tablet computer, electronic book reader device, household appliance, cellular phone, among others.

The devices 202 may be communicatively coupled to the servers 208 hosting application 204 over one or more networks 212 via wired technologies (e.g., wires, USB, fiber optic cable, etc.), wireless technologies (e.g., RF, cellular, satellite, Bluetooth®, etc.), or other connection technologies. The networks 112 may be any type of communication network, including data and/or voice networks, and may be implemented using wired infrastructure (e.g., cable, CAT5, fiber optic cable, etc.), a wireless infrastructure (e.g., RF, cellular, microwave, satellite, Bluetooth®, etc.), and/or other connection technologies. Generally, the networks 212 carry data between the application 104 and the devices 102.

The application 204 generally refers to a network accessible platform implemented as a computing infrastructure of processors, storage, software, data access, and so forth, illustrated as servers 208, and that is maintained and accessible via one or more networks 212. Typically, the application 204 does not require end-user knowledge of the physical location and configuration of the system that delivers the services. Common expressions associated with cloud services include "on-demand computing," "software as a service (SaaS)," "platform computing," "network accessible platform" and so forth. For example, the application 204 may include one or more online marketplace (e.g., ABCstore.com®), one or more customer service system, one or more social network, one or more index or database, one or more email systems, among others.

The monitoring service 206 generally refers to a network accessible platform implemented as a computing infrastructure of processors, storage, software, data access, and so forth, illustrated as servers 208, and that is configured to monitor the application 204 directly. For example, the monitoring service 206 may be one or more application installed on servers 208 in addition to the application 204 and configured to access the data flow of the application 204.

In another example, the monitoring service 206 may be part of the application 204, such as embedded code segments or blocks.

The monitoring service 206 maintains one or more domains 214(1)-(N) in order to monitor usage of the application 204, as well as to detect abnormal volume or usage in substantially real time. Each of the domains 114(1)-(N) are maintained as a tree-structure in which each node of the tree maintains an independent counter equal to the volume of contacts or interactions associated with each particular node.

The monitoring service 206 is further configured to detect abnormal volume with respect to the application 204. In some particular implementations, the monitoring service 206 is configured to detect abnormal volume with respect to high cardinality metrics. For instance, an abnormal volume or usage level may be indicative of seasonality changes with regards to purchasing or an error within the application 204. In other instances, the abnormal volume of contacts or interactions may necessitate the re-allocation of servers or processing resources, which may be accomplished if the abnormal volume levels can be detected in substantially real time.

The monitoring service 206 is able to detect the abnormal volume levels by first normalizing the counters associated with each of the leaf nodes based on counters associated with one or more of the parent nodes. Once the counters are normalized, the monitoring service 106 may detect abnormal volume levels by comparing the normalized counters associated with each of the leaf nodes in the domain tree-structure to one or more predefined or historical thresholds.

The monitoring service 206 may be further configured to improve the accuracy and timing associated with identifying abnormal volume levels by applying a sliding-window or time period to the domains 214(1)-(N) to compensate for seasonality patterns caused by the volume of contacts or interactions associated with a sales domain varying over time. When applying the sliding-window or time period, the monitoring service 206 removes contacts or interactions from the counters as the contact ages. For example, a sliding-window of fifteen minutes may be applied such that any contact that was made with the application 204 more than fifteen minutes prior to the current time are subtracted from the counters. In this manner, the counters associated with the leaf nodes are adjusted to compensate for changes in the time of day and normalized based on the total number of contacts or interactions within a particular domain 214(1)-(N). Thus, a monitoring service 206 that is able to accurately detect abnormal volume with respect to the application 204 in substantially real time, is described herein.

In the illustrated example, the devices 102 make multiple requests 216 to or contacts with the application 204. For example, users may utilize the devices 202 to purchase merchandise from the application 204, contact a customer service representative or associate, access a social media website, etc. Thus, the requests 216 may include a plurality of data associated with purchasing merchandise, contacting a customer service representative or associate, and/or accessing a social network, etc. Regardless of the type of the requests 216, the application 204 responds to each request by providing data 218 associated with each request back to the requesting device 202.

In the illustrated example, the monitoring service 206 monitors the application 204 as the application 204 processes the requests 216 to determine one or more metrics 220. Generally, the metrics 220 includes data related to the number of the requests 216 or contacts processed by the application 204. In some instances, the metrics 220 may include details related to the type of requests 216 received. For example, the metrics 220 may include the type or name of each product purchased via the application 204, in addition to the number of purchases of each product.

As the metrics 220 are collected by the monitoring service 206, the monitoring service 206 updates each of the domains 214(1)-(N) related to one of the requests 216. The monitoring service 206 updates the domains 214(1)-(N) by revising the tree-structure maintained for each of the domains 214(1)-(N). For example, if the metrics 220 collected by the monitoring service 206 indicate that 15 yellow toy trucks were purchased since the last publication, the monitoring service 206 may update the tree-structure associated with the sales domain by adding 15 contacts to the marketplace node counter, 15 contacts to the toy department node counter, and 15 contacts to the yellow toy truck node counter. In some implementations, the monitoring service 206 may also update the tree-structures by removing aged contacts from the counters.

The monitoring service 206 is, thus, able to monitor volume changes by normalizing the counters at the leaf nodes and/or interior nodes based on the counters at the root node and comparing the normalized counters to one or more thresholds. If the monitoring service 206 determines that one or more of the normalized counters exceeds one or more of the thresholds, the monitoring service 206 may generate and send one or more alerts 222 to the application 204 or an administrator of the application 204. In one example, the alerts 222 may be configured to indicate to the administrator the location of the abnormal volume and some type of warning as to the level of severity.

In some examples, the alerts 222 may include a product name receiving an abnormal number of purchases or views, as well as the number of abnormal contacts or interactions. In another example, the alerts 222 may include a list of actionable tasks or suggestions, which may be performed to correct the abnormal volume flow and/or a list of non-actionable nodes in which the abnormal volume is uncorrectable or temporary. In some examples, the alert 222 may include a user selectable link to an exploration interface that the administrator or other user may utilize to diagnose the cause of the abnormal volume.

Figure 3:
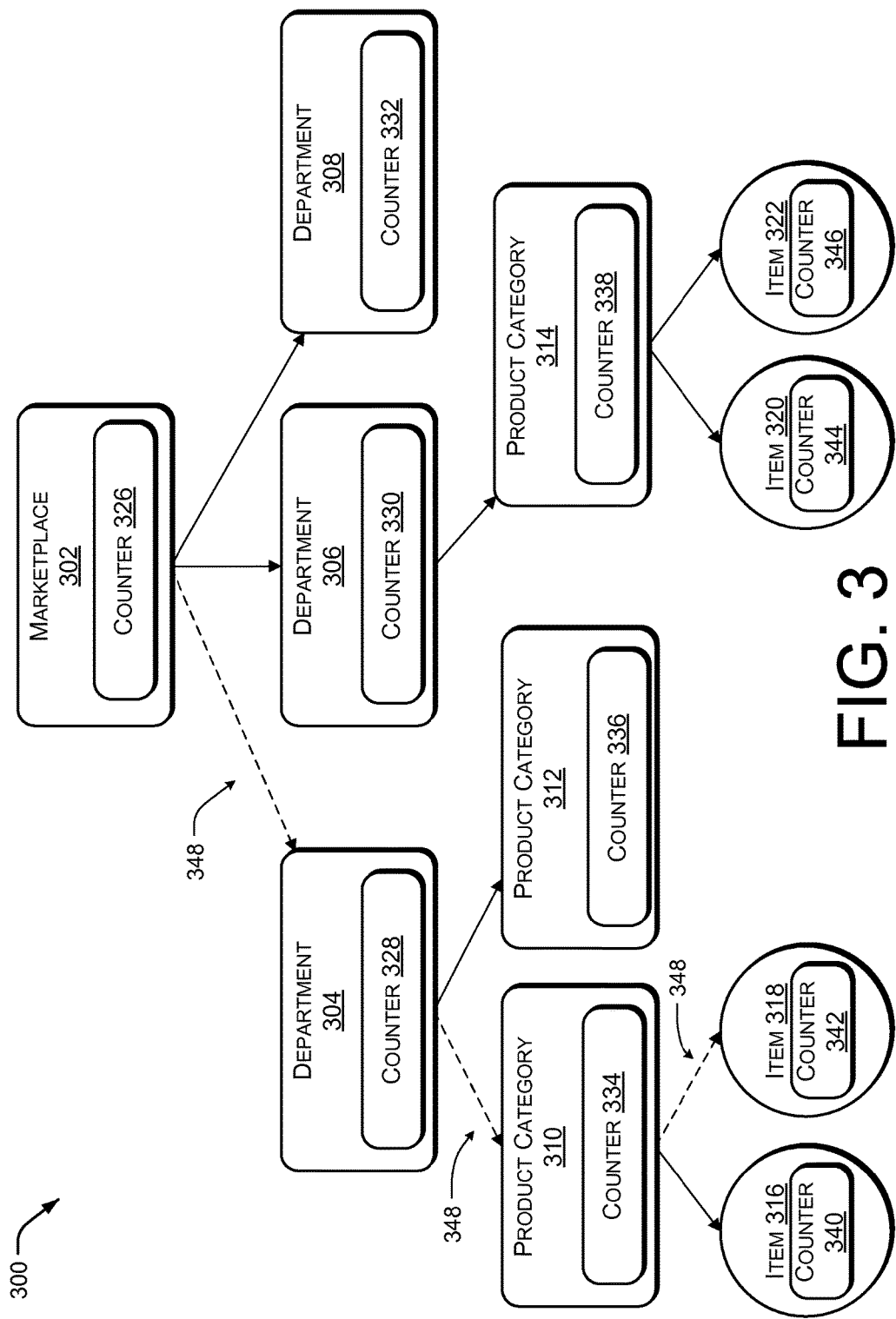
FIG. 3 illustrates an example domain tree-structure for use by the monitoring services.

FIG. 3 illustrates an example domain tree-structure 300 for use by a monitoring service, such as monitoring services 106 and 206 of FIGS. 1 and 2. In the illustrated example, the domain 300 is representative of a sales domain. The domain 300 includes root node 302 representative of the marketplace (e.g., www.ABCstore.com®), three interior nodes 304, 306, and 308 representative of departments within the marketplace (e.g., books, clothing, toys, etc.), two interior nodes 310, 312, and 314 representative of product categories (e.g., fiction books, shirts, board games, etc.) within a department, and four leaf nodes 316-320 representative of products or items for sale within the marketplace (e.g., "the cat in the hat," long sleeve slim fit shirts, Monopoly®, etc.).

A counter is associated with each one of the nodes 302-322. For example, counter 326 is associated with the marketplace node 302, counters 328, 330, and 332 are associated with the department nodes 304, 306, and 308 respectively, counters 334, 336, and 338 are associated with the product category nodes 310, 312, and 314 respectively, and counters 340-336 are associated with item nodes 316-322 respectively. Each of the counters 326-346 are representative of the number of contacts or interactions or the volume of contacts or interactions of the related node by a customer or user of a monitored application.

Each of the nodes 302-322 are placed along a division-path or a route from the root or marketplace node 302 to one of the leaf nodes 316-322. For example, item node 318 is illustrated as the end of the division-path 348 starting from the marketplace node 302 and traveling through both department node 304 and product category node 310. In some implementations, each of the counters along a division-path, such as counters 326, 328, 334, and 342 along division-path 348 are incremented and decremented in unison.

In general, each of the counters 326-346 are incremented as the monitoring service receives or collects metrics related to sales of particular items and decremented as the metrics age. For example, if the monitoring service receives an indication that item of the item node 318 was purchased, the monitoring service increments each of the counters 326, 328, 336, and 342 along division-path 348 associated with item node 318, as the purchase of the item of the item node 318 caused the purchaser to contact the marketplace, the department and the product category associated with the item of the item node 318.

The monitoring service may also be configured to track the age of each contact used to increment one or more of the counters 326-346 and to decrement the counters 326-346 when the contact was made more than a predetermined period of time ago. For example, if the purchase of the item of the item node 318 happened at a time ($t_1$), the monitoring service may increment the counters 326, 328, 334, and 342 along division-path 348 and start a timer. The monitoring service may then apply a sliding-window or period of time, such that when the window or period of time expires, for instance, at a time ($t_2$) the monitoring service decrements the counters 326, 328, 334, and 342 along the division-path 348. In this way, a value of the counters 326, 328, 334, and 342 only reflect purchases of items made within the sliding-window or time period. Thus, the monitoring service is able to adjust for seasonality and daily purchasing patterns without relying on historical data.

In some implementations, the monitoring service monitors a volume of contacts associated with each of the nodes 302-322 based on the values stored in the counters 326-346. As described above, the monitoring service increments and decrements each of the counters 326-346, as metrics related to purchased items are received or collected by the monitoring service. The monitoring service also utilizes the tree-structure of the domain 300 to normalize the counters 336-346 associated with each of the leaf nodes 316-322. For example, the monitoring service may normalize the value of counter 342 based on the value of counter 326, such that an abnormal volume of contacts or interactions at the item of the item node 342 may be detected with respect to the total number of contacts or interactions in the marketplace.

By normalizing the volume of contacts or interactions as described above, the monitoring service is able to detect abnormal volume with respect to the total amount of activity within the application being monitored rather than detecting abnormal volume with respect to historical volume metrics. Since the monitoring service is able to apply both the sliding-window or time period and normalize the volume of contacts or interactions based on the total volume in the marketplace node 302, the monitoring service is able to detect and report abnormal volume within the domain 300 in substantially real time.

Figure 4:
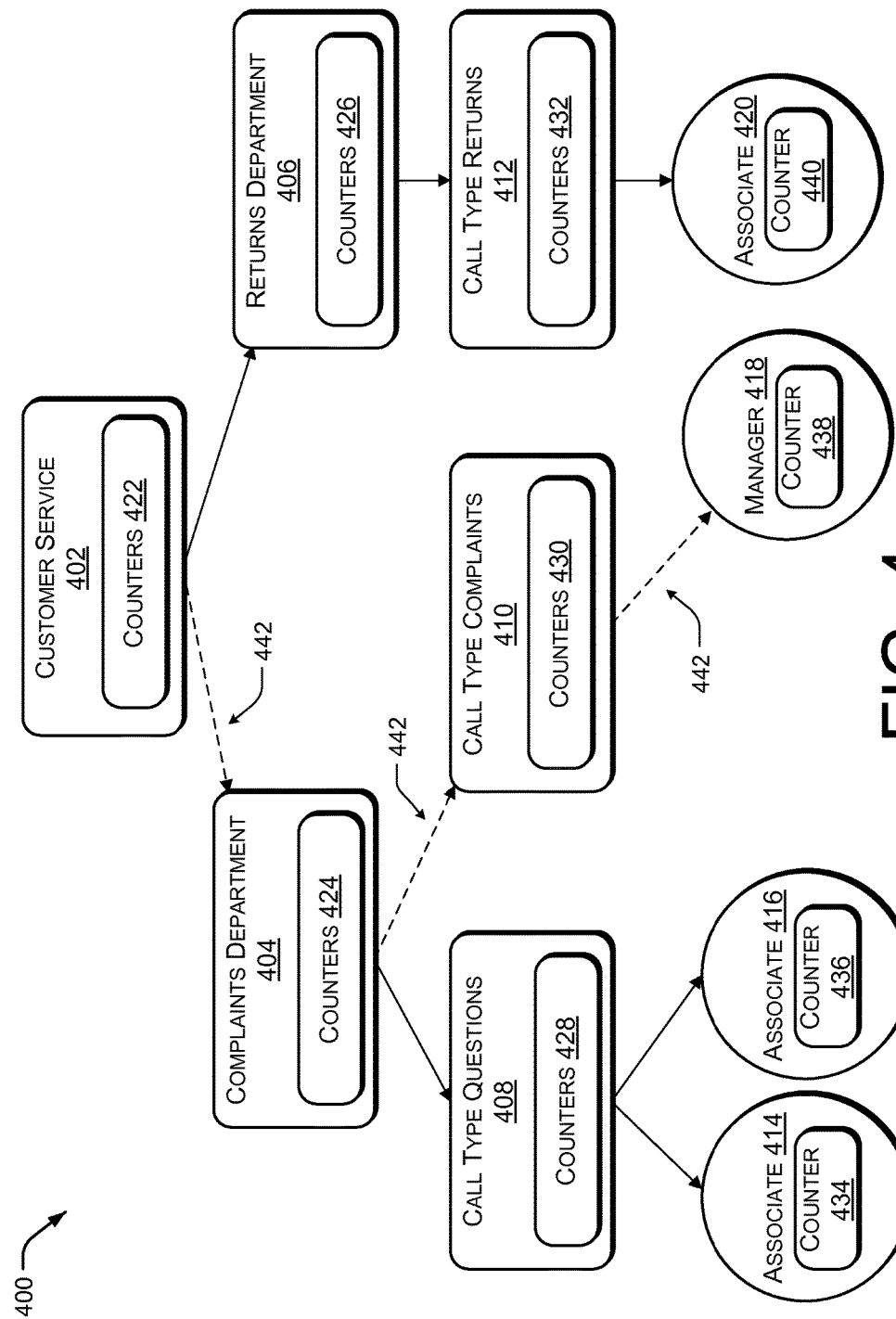
FIG. 4 illustrates another example domain tree-structure for use by the monitoring services.

FIG. 4 illustrates another example domain 400 including a tree-structure for use by the monitoring services, such as monitoring services 106 and 206 of FIGS. 1 and 2. In the illustrated example, the domain 400 is representative of a customer service domain. The domain 400 includes root node 402 representative of the customer service department at a company, two interior nodes 404 and 406 representative of sub-departments within the customer service department (e.g., complaints and returns), three interior nodes 408, 410, and 412 representative of types of calls within the complaints department (e.g., questions, complaints, and returns), and three leaf nodes 414, 416, and 420 representative of customer service associates or representative, as well as a manager node 418 representative of a customer service manager.

A counter is associated with each one of the nodes 402-420. For example, counter 422 is associated with the customer service root node 402, counters 424 and 426 are associated with the department nodes 404 and 406, respectively, counters 428, 430, and 432 are associated with the call type nodes 408, 410, and 412, respectively, and counters 432-440 are associated with the customer representative or associate nodes 414-420 respectively. Each of the counters 420-440 are representative of the number of calls or the volume of calls related to each one of the nodes by a customer or user of a monitored application, such as applications 104 and 204 of FIGS. 1 and 2.

Each of the interior nodes 404-412 are placed along a division-path or a path from the root node 402 to the particular leaf node 412-420. For example, the manager node 418 is illustrated as the end of the division-path 442 starting from the customer service node 402 and traveling through both complaints department node 404 and the interior call node 410. In some implementations, each of the counters along a division-path, such as counters 422, 424, 430, and 438 along division-path 442 may be incremented and decremented in unison based on contacts or call metrics related to manager node 418.

Each of the counters 420-440 are incremented as the monitoring service receives or collects metrics related to sales of particular items and decremented as the metrics age. For example, if the monitoring service receives an indication that a call was received or taken by the manager associated with the manager node 418, the monitoring service may increment each of the counters 422, 424, 430, and 438 along division-path 442 associated with the manager node 418, as the contact or call with the manager associated with manager node 418 caused a contact with the customer service node 402, the complaints department node 404, the type of call associated with node 410, and the manager node 418.

The monitoring service may also be configured to track the age of each contact or call that caused one of the counters 420-440 to increment and to decrement the counters 420-440 when the contact occurred more than a predetermined period of time ago. For example, if the contact with the manager node 418 occurred at a time (t1), the monitoring service may increment the counters 422, 424, 430, and 438 along division-path 442 and start a timer. The monitoring service may also apply a sliding-window or period of time, such that when the window or period of time expires, for instance, at a time (t2) the monitoring service decrements the counters 422, 424, 430, and 438. In this way, the counters reflect calls, contacts, or interactions received within the sliding-window or time period. In this manner, the monitoring service is able to adjust for seasonality and daily call patterns associated with operating a customer service center without relying on historical data.

In some implementations, the monitoring service monitors a volume of contact associated with each of the nodes 402-420 based on the values stored in the counters 420-440. As described above, the monitoring service increments and decrements each of the counters 420-440 as metrics related to calls or contacts are received or collected by the monitoring service. The monitoring service also utilizes the tree-structure of the domain 400 to normalize the counters 422-438 associated with each of the interior nodes 404-412 and/or the leaf nodes 414-420. For example, the monitoring service may normalize the value of counter 438 based on the value of counter 422, such that an abnormal volume of contacts or interactions at the manager node 418 may be detected with respect to the total number of contacts or calls handled by the customer service center during the sliding-window or period of time.

By normalizing the volume of contacts or interactions as described above, the monitoring service is able to detect abnormal volume with respect to the total amount of current activity within the application being monitored rather than detecting abnormal volume with respect to historical volume metrics. Additionally, since the monitoring service is able to apply both the sliding-window and normalize the volume of contact using a parent node or the root node 402, the monitoring service is able to detect and report abnormal volume within the domain 400 in substantially real time.

Figure 5:
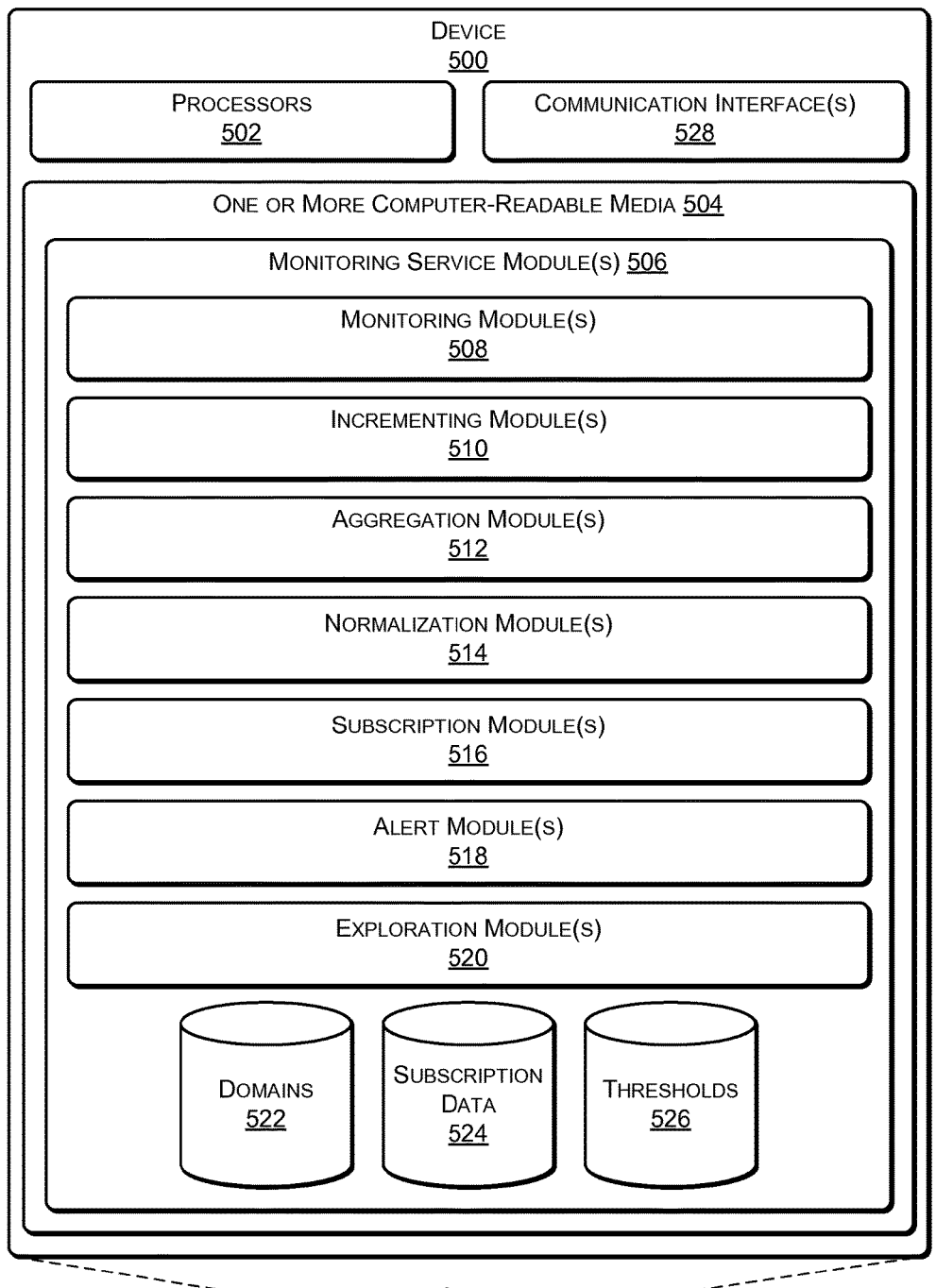
FIG. 5 illustrates an example architecture of a device configured to monitor one or more applications.

FIG. 5 illustrates an example architecture of a device 500 configured to monitor one or more applications, such as applications 104 or 204 of FIGS. 1 and 2. In general, one or more servers, such as servers 110 or 208 of FIGS. 1 and 2, may be configured to host a monitoring service and collectively comprise processing resources, as represented by processors 502, and computer-readable storage media 504.

The computer-readable storage media 504 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

Several modules such as instruction, data stores, and so forth may be stored within the computer-readable storage media 504 and configured to execute on the processors 502 to perform the actions associated with the monitoring service described herein. For example, a monitoring service module 506 may be provided to implement the monitoring service of FIGS. 1 and 2. The monitoring service module 506 may also include one or more modules for performing the actions associated with monitoring an application, for example, the monitoring service module 506 may include a monitoring module 508, an incrementing module 510, an aggregation module 512, a normalization module 514, a subscription module 516, an alert module 518, and an exploration module 520. The computer-readable storage media 504 may also store data usable by the monitoring service module 506. For example, the computer-readable storage media 504 may store domains 522 (e.g., domains 300 and 400 of FIGS. 3 and 4), subscription data 524, and thresholds 526.

The device 500 may also include one or more communication interfaces 528 for communicating with the monitored applications over one or more networks. The communication interfaces 528 may support both wired and wireless connections to various networks, such as cellular networks, radio, WiFi networks, short-range or near-field networks (e.g., Bluetooth®), infrared signals, local area networks, wide area networks, the Internet, and so forth.

In an example, the monitoring service module 506 maintains one or more domains 522 related to the monitored applications. For instance, the monitoring service module 506 may maintain a first domain or tree-structure related to sales at an online marketplace and a second domain or tree-structure related to the customer service center associated with the online marketplace. In the example, the monitoring module 508 may receive or collect volume metrics associated with the first and second domains, as purchases are made at the online marketplace and calls are received at the customer service center.

As the metrics are received or collected by the monitoring module 508, the incrementing module 510 may cause counters associated with particular nodes of the first and/or second domain to increment. For instance, if the monitoring service module 506 receives an indication that a call was received or taken by the manager in the returns department of the customer service domain (i.e., the second domain), the incrementing module 510 may increment each of counters on a division-path (e.g., the root node, the return department node, a customer service associate node related to the customer service associate who first handled the call, and the managers node) of the second domain associated with the manger.

The aggregation module 512 applies a sliding-window or timer period to each of the contacts and/or interactions (e.g., purchases or calls) to decrement the counters within the domains. For example, the aggregation module 512 may apply a ten minute sliding-window to remove from the counters each contact or interaction that occurred more than ten minutes prior. In this way, the counters reflect contacts or interactions received within the sliding-window and monitoring service module 506 is able to adjust for seasonality and daily volume changes without relying on historical data. In some implementations, the sliding-window or time period associated is configurable and the sliding-windows or time period associated with different domains 522 may vary from each other. For example, purchasing patterns may vary based on a five minute window, while customer service complaints may vary based on one hour window. In one particular implementation, the aggregation module 512 may be configured to receive a request from a client and in response to sum the number of contacts that occurred over the time period. The normalization module 514 may utilize the tree-structure of the domains 522 to normalize a number of contacts with an interior node or with a leaf node based on the total number of contacts or interactions at the root node or at a parent node. By normalizing the volume of contacts or interactions based on the tree-structure, the monitoring service is able to detect abnormal volume with respect to the total amount of current activity within the application rather than with respect to historical volume metrics. In this manner, rather than collecting years of historical data to compare with the current metrics, the monitoring service describe herein may be able to operate accurately within no more than a few minutes. For example, once the volumes are normalized, the volume at each node may be compared to one or more thresholds 526 to determine if an abnormal volume exists.

In some examples, the threshold may represent a fraction or percentage of volume, which at any given time may represent the contacts or interactions within one of the domains 522. For instance, a threshold of 0.1 may represent that 10% of the contacts or interactions within one of the domains 522 should be present at a particular node. Thus, if the threshold is 0.1, for every 100 users there should be ten contacts or interactions with the node. In this manner, in some examples, different thresholds may be set for each one of the nodes. In some cases, the thresholds may be user assigned. In other cases, the thresholds may be calculated or determined based on a machine learning algorithm or on past historical usage rates, such that the longer the monitoring service module 506 is in use the more accurate the detection becomes.

The subscription module 516 is configured to allow one or more system administrators of the applications being monitored to subscribe to one or more of the domains 522 in order to receive alerts from the alert module 518 in response to an abnormal volume. In some implementations, the subscription module 516 may be configured to allow the system administrators to subscribe to a particular node of a domain that the administer desires to monitor. For example, in the sales domain the administrators may subscribe to a particular item or product in order to receive alerts related to an abnormal number of sales associated with the particular item or product. Generally, the subscriptions are stored as the subscription data 524, such that various other modules (e.g., the alert module 518) may access the subscriptions in order to perform the associated operations.

The alert module 518 is configured to provide alerts to a user in response to the monitoring service module 506 detecting an abnormal volume at a node of a domain to which the user has subscribed. For example, the alert may take the form of an email, instant message, post on a social network, phone call (such as an automated call), text message, etc. The alert may include information related to the total volume in the domain 522, the abnormal node, the volume at the abnormal node, and/or a list of actionable tasks or suggestions that may be performed to correct or compensate for the abnormal volume. In some instances, the alert may include a user selectable link to an exploration interface that the administrator or other user may utilize to diagnose the cause of the abnormal volume.

In some implementations, the monitoring service module 506 may include one or more exploration modules 520 to allow an administrator or user of the system to locate and diagnose abnormal volumes upon detection. For instance, the exploration module 520 may include a user interface that allows the administrator or user to track the contacts or interactions as the contacts or interactions are processed by the monitored application. In one example, the monitoring service module 506 may detect an abnormal volume at a node a user has subscribed to by comparing a normalized counter value at the subscribed node at a threshold assigned to the subscribed node. In other examples, the exploration module 520 includes a trend extraction module that may provide data and/or graphs related to trends within the metrics being monitored by the monitoring service module 506. In some instances, the alert module 518 may notify the user of the abnormal volume at the subscribed node and include a link to an interface associated with the exploration module 520 that the user may utilize to diagnose the root cause of the issue and/or to view trends in the volume of contacts over time.

Figure 6:
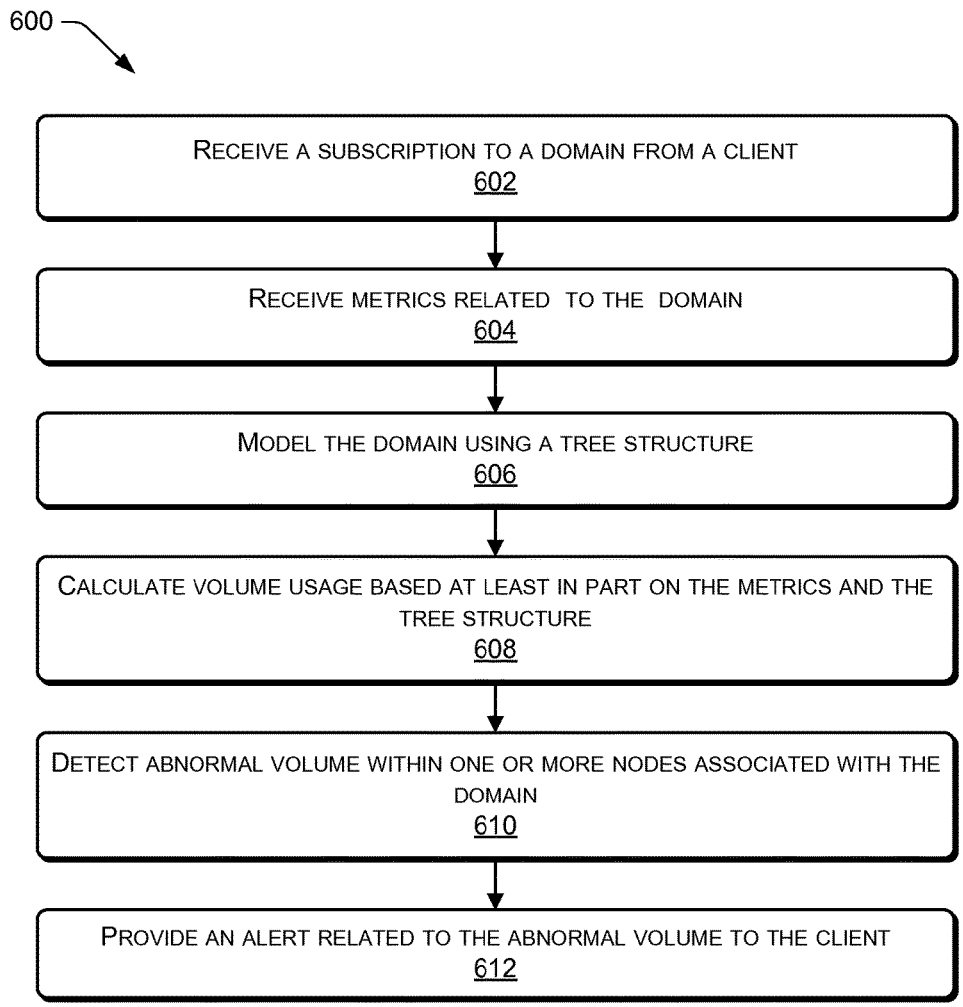
FIG. 6 illustrates an example flow diagram showing an illustrative process to for detecting abnormal volume change.

FIG. 6 is a flow diagram illustrating example processes for implementing monitoring services. The process is illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 6 is an example flow diagram 600 showing an illustrative process to for detecting abnormal volume change. At 602, the monitoring service receives a subscription to one or more domains from a client. In some cases, the subscription may be to one or more particular nodes within the domain, while in other cases the subscription may be to the domain in its entirety. By subscribing the domain and/or nodes the client is requesting to receive alerts related to abnormal volume metrics detected by the monitoring service.

At 604, the monitoring service receives metrics related to the one or more domains that the client subscribed. For example, if the client subscribed to a particular item node, the metrics may be related to the number of purchases within the prior minute of the particular item within a marketplace. In some cases, the monitoring service may collect the metrics from the application, while in other cases; the metrics may be published by the application itself. In one particular example, the monitoring service may be configured to monitor metrics having a high cardinality or volume, for instance, hundreds of thousands of contacts or sales per day.

At 606, the monitoring service models each domain using a nodal tree-structure. For example, the monitoring service may add one or more nodes to the domain if the volume metrics indicate that the items purchased are not associated with any current node within the domain. The monitoring service may also increment any counters associated with nodes along the domain path of any items purchased.

At 608, the monitoring service calculates the volume of usage at each node based at least in part on the metrics and the tree-structure. For example, the monitoring service may normalize the number of contacts or interactions at each leaf node or interior node based on the number of contacts at the root node. The monitoring service may also apply a sliding-window or time period to each of the contacts to remove stale or aged contacts from the tree-structure in order to model the application usage during a period of time.

At 610, the monitoring service detects abnormal volume within one or more of the nodes associated with the domain. For example, the monitoring service may compare the normalized contact volume at each of the interior and leaf nodes to a threshold assigned to the interior node or leaf node in order to detect abnormal volume at the particular node. In some instances, the threshold may be based on the mean of the normalized sliding-window. For example, a threshold may be applied using multiple brackets in which each bracket has a particular threshold and the particular threshold is utilized to determine abnormal volume of a node when the mean of the normalized sliding-window falls within the corresponding bracket.

At 612, the monitoring service provides an alert related to abnormal volume to the client. For example, the monitoring service may provide an alert to the client for each node the client subscribed to if an abnormal volume is detected at the subscribed node. The alert may be an email, instant message, post on a social network, phone call (such as an automated call), text message, etc. The alert may include information related to the total volume in the domain, the abnormal node, the volume at the abnormal node, and/or a list of actionable tasks or suggestions that may be performed to correct or compensate for the abnormal volume. In some instances, the alert may include a user selectable link to an exploration interface that the administrator or other user may utilize to diagnose the cause of the abnormal volume.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A method comprising:
    under control of one or more computer systems configured with executable instructions,
        generating a tree structure modeling volume of end-user interactions associated with a domain representative of an application, the tree structure including data stored in a plurality of nodes, each of the plurality of nodes representative of an individual page associated with the application;
        receiving a first indication of at least a first end-user interaction with a node of the plurality of nodes during a period of time, the node including a counter representative of a number of end-user interactions with a page associated with the application and the node having a parent node, wherein the node and parent node are arranged along a same division-path of the tree structure;
        incrementing a value of the counter based at least partly on receiving the first indication;
        receiving a second indication of at least a second end-user interaction with the node outside of the period of time;
        incrementing the value of the counter based at least partly on receiving the second indication;
        decrementing the value of the counter based at least partly on the second end-user interaction being outside of the period of time and generating a decremented value;
        normalizing the decremented value of the counter based at least in part on a value of an additional counter associated with the parent node to produce a normalized decremented value;
        determining that the particular node is experiencing abnormal volume based at least in part on the normalized decremented value and at least one threshold corresponding to a volume of end-user interactions; and
        re-allocating at least one of a server or a processing resource of the one or more computer systems based at least partly on determining that the node is experiencing abnormal volume.

2. The method as recited in claim 1, further comprising: starting a timer in response to incrementing the additional counter associated with the parent node; and decrementing the counter associated with the node and the additional counter associated with the parent node based at least partly on expiration of the timer.

3. The method as recited in claim 1, wherein the parent node is a root node.

4. The method as recited in claim 1, further comprising sending a link to a client device based at least in part on determining that the node is experiencing abnormal volume, the link being selectable to access a user interface indicating metrics related to end-user interactions with the page associated with node.

5. The method as recited in claim 1, wherein the at least one threshold corresponds to a fraction of the volume of end-user interactions.

6. A device comprising:
    one or more processors; and
    non-transitory computer-readable storage media storing computer-executable instructions, which when executed by the one or more processors cause the one or more processors to:
        generate a tree-structure modeling a domain associated with an application, the tree-structure including a plurality of nodes arranged in one or more division-paths;
        decrement a counter of a node of the plurality of nodes, based at least partly on a number of end-user interactions with the application that are related to the node and that take place outside of a period of time, to generate a decremented value;
        normalize the decremented value of the counter based on a value of an additional counter associated with a parent node of the node within the tree structure to produce a normalized decremented value, wherein the node and parent node are arranged along a same division-path of the one or more division-paths;
        determine that the node is experiencing abnormal volume based at least in part on the normalized decremented value and a threshold value corresponding to a volume of end-user interactions; and
        re-allocate at least one of a server or a processing resource of the device based at least partly on determining that the node is experiencing abnormal volume.

7. The device as recited in claim 6, wherein the computer-readable storage media further stores computer-executable instructions, which when executed by the one or more processors cause the one or more processors to receive volume metrics from the application.

8. The device as recited in claim 7, wherein the volume metrics include at least a number of end-user interactions corresponding to the node.

9. The device as recited in claim 6, wherein the computer-readable storage media further stores computer-executable instructions, which when executed by the one or more processors cause the one or more processors to collect volume metrics from the application.

10. The device as recited in claim 9, wherein the node is associated with the division-path that includes at least a portion of the plurality of nodes, and the computer-readable storage media further stores computer-executable instructions, which when executed by the one or more processors cause the one or more processors to increment the value of the counter and a value of individual counters associated with individual nodes along the division-path at least partly based on the volume metrics including a contact with the node.

11. The device as recited in claim 10, wherein the computer-readable storage media further stores computer-executable instructions, which when executed by the one or more processors cause the one or more processors to:

start a timer in response to incrementing the value of the counter and the value of the individual counters associated with the individual nodes along the division-path; and decrement the value of the counter and the value of the individual counters associated with the individual nodes along the division-path based at least partly on expiration of the timer.

12. The device as recited in claim 6, wherein the computer-readable storage media further stores computer-executable instructions, which when executed by the one or more processors cause the one or more processors to alert a client based at least partly on determining that the node is experiencing abnormal volume.

13. The device as recited in claim 6, wherein the domain is related to at least one of:
- a customer service application;
- an online sales application;
- a social network;
- a subscription service or application; or
- an inventory application.

14. The device as recited in claim 6, wherein determining that the node is experiencing abnormal volume includes comparing the normalized decremented value to the threshold value.

15. The device as recited in claim 14, wherein the threshold value is particular to the node.

16. One or more non-transitory computer-readable media having computer-executable instructions that, when executed by one or more processors, cause the one or more processors to perform operations comprising:

generating a tree structure modeling a domain associated with an application, the tree-structure including a root node and a first leaf node, the root node including a first counter and the first leaf node including a second counter, a first value of the first counter and a second value of the second counter based at least in part on volume metrics received from the application;

decrementing, based at least partly on an end-user interaction with the application taking place outside of a window of time, the first value of the first counter to generate a decremented first value and the second value of the second counter to generate a decremented second value;

determining a normalized value of the decremented second value based at least partly on the decremented first value;

determining that the first leaf node is experiencing abnormal volume based at least in part on the normalized value of the decremented second value and a predefined first threshold, wherein the predefined first threshold is determined based on at least one of historical data associated with the volume metrics or a mean of the normalized value of the decremented second value; and re-allocating at least one of a server or a processing resource associated with hosting the application based at least partly on determining that the first leaf node is experiencing abnormal volume.

17. The one or more computer-readable media as recited in claim 16, wherein:

the tree-structure includes a second leaf node, the second leaf node including a third counter having a third value based at least in part on the volume metrics received from the application; and the one or more computer-readable media store instruction which when executed by the one or more processors cause the one or more processors to perform the following actions:

determining a second normalized value of the third value based at least partly on the first value of the first counter; and determining that the leaf node is experiencing abnormal volume based at least in part on the second normalized value and a second threshold.

18. The one or more computer-readable media as recited in claim 17, wherein the first threshold differs from the second threshold.

19. The one or more computer-readable media as recited in claim 16, having computer-executable instructions that, when executed by the one or more processors, cause the one or more processors to perform operations comprising receiving a client subscription related to the first leaf node.

20. The one or more computer-readable media as recited in claim 16, having computer-executable instructions that, when executed by the one or more processors, cause the one or more processors to perform operations comprising, alerting a client based at least partly on determining that the first leaf node is experiencing abnormal volume.

* * * * *

UNITED STATES PATENT AND TRADEMARK OFFICE
CERTIFICATE OF CORRECTION

PATENT NO. : 10,009,246 B1
APPLICATION NO. : 14/228916
DATED : June 26, 2018
INVENTOR(S) : Gary Ange Benattar et al.

Page 1 of 1

It is certified that error appears in the above-identified patent and that said Letters Patent is hereby corrected as shown below:

In the Claims

Column 15, Line 56, delete "particular".

Signed and Sealed this
Fourth Day of June, 2019

Andrei Iancu
*Director of the United States Patent and Trademark Office*